United States Patent [19]
Taylor

[11] Patent Number: 5,136,876
[45] Date of Patent: Aug. 11, 1992

[54] APPARATUS AND PROCESS FOR DETERMINING FLUID LEAK RATES

[75] Inventor: Otis C. Taylor, Lake Jackson, Tex.

[73] Assignee: The Dow Chemical Company, Midland, Mich.

[21] Appl. No.: 481,912

[22] Filed: Feb. 16, 1990

Related U.S. Application Data

[63] Continuation-in-part of Ser. No. 206,635, Jun. 14, 1988, abandoned, which is a continuation-in-part of Ser. No. 3,975, Jan. 16, 1987, abandoned.

[51] Int. Cl.$^5$ .............. G01M 3/08; G01M 3/24
[52] U.S. Cl. .................. 73/40.5 A; 73/587; 73/592; 376/250; 376/252
[58] Field of Search ............. 73/40.5 A, 592, 587; 364/551.01; 376/250, 252

[56] References Cited

U.S. PATENT DOCUMENTS

| | | | |
|---|---|---|---|
| 4,201,092 | 5/1980 | Dau | 73/40.5 A |
| 4,457,163 | 7/1984 | Jäckle | 73/40.5 A |
| 4,543,817 | 10/1985 | Sugiyama | 73/40.5 A |
| 4,609,994 | 9/1986 | Bassim et al. | 364/551 |
| 4,823,600 | 4/1989 | Biegel et al. | 73/40.5 A |
| 4,852,390 | 8/1989 | Fisch | 73/40.5 A |

FOREIGN PATENT DOCUMENTS

| | | | |
|---|---|---|---|
| 0080535 | 4/1987 | Japan | 73/40.5 A |
| 0176927 | 7/1989 | Japan | 73/40.5 A |
| 0187430 | 7/1989 | Japan | 73/587 |
| 0311242 | 12/1989 | Japan | 73/587 |

Primary Examiner—Hezron E. Williams
Assistant Examiner—Rose M. Finley

[57] ABSTRACT

An apparatus and process for controlling a high pressure fluid leak, such as a combustible gas, by determining the leak rate of the fluid from the leak source utilizing sound sensors wherein the step of determining the leak rate includes the step of comparing the signals from the sound sensors with a known standard curve, and activating a controller for controlling the fluid to prevent the fluid from spreading in the atmosphere.

29 Claims, 5 Drawing Sheets

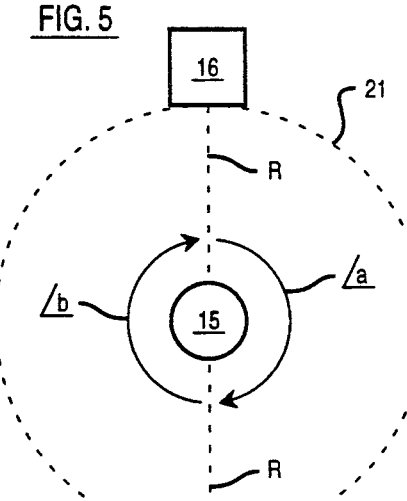
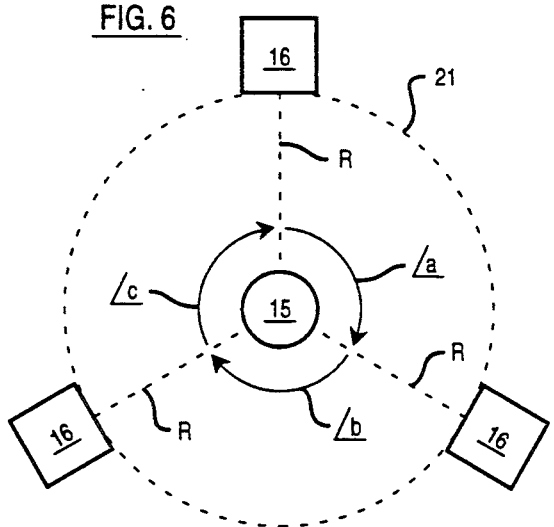
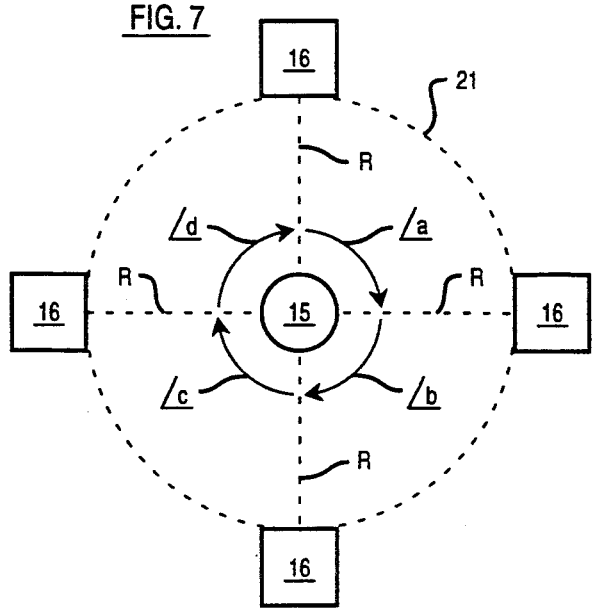

APPARATUS AND PROCESS FOR DETERMINING FLUID LEAK RATES

CROSS-REFERENCE TO RELATED APPLICATIONS

This is a continuation-in-part of U.S. patent application, Ser. No. 206,635 filed Jun. 14, 1988, now abandoned which is, itself, a continuation-in-part of U.S. patent application Ser. No. 003,975, filed Jan. 16 1987, now abandoned, herein incorporated by reference.

FIELD OF THE INVENTION

Means and methods for detecting, and reacting to, leaks in process equipment.

BACKGROUND OF THE INVENTION

This invention pertains to means and methods for determining the rate at which fluids, i.e. gases and liquids, are leaking from predetermined leak sources such as pipelines, process piping, storage tanks, process vessels and underground caverns and for automatically and remotely determining fluid leak rates and directing a computer processor and controller to take the appropriate process steps, for example, to minimize product or equipment loss from fire, explosions or atmospheric contamination.

Fluid leakage such as vapor or gas leaks of various rates and sizes can occur in process equipment any time due to faulty, damaged, or corroded equipment. Because leaks can vary in sizes and rates, what is needed in the field is an apparatus and process which provides to an operator the ability to quickly determine that a leak is occurring and that the leak is of a particular size and rate which may pose a danger to personnel and equipment. From the leak rate and size information, immediate action can be taken to minimize the leak, to stop the leak, or, in the case of a combustible gas, to ignite the leak if necessary to avoid its spreading into the surrounding areas and contaminating the environment.

When leaks of a highly combustible or explosive gas occurs from process equipment, no matter how small the quantity, the leak may pose a danger to human life and property. A significant cloud of an explosive gas released unchecked or uncontrolled, poses a risk to human life and property because of the potential for ignition of the cloud after the cloud has extended over a considerable area or space. It is desired to minimize this risk by providing a process and apparatus for controlling leaks from high pressure combustible gaseous sources.

Although there are several commercially available devices that will detect that a leak is occurring in a general process area, none of these commercially available devices will determine at what rate the leak is occurring, i.e., the size of orifice the leak is passing through. The rate of leakage is vital information for determining what action is required under a particular situation to control the leak.

Therefore, what is needed in the industry today is an apparatus and process that not only would signal that a leak is occurring, but that the leak is of a certain size. By knowing the size of the leak, operating personnel can take action to control or contain the leak in a particular situation and avoid product loss and a potential for disaster.

SUMMARY OF THE INVENTION

One aspect of the present invention is an apparatus and process for determining the leak rate and the size of a fluid leak through an orifice in process equipment by measuring the sound pressure/frequency level of the fluid leak and then comparing the sound pressure/frequency level measured to a predetermined or known standard for fluid leak rates.

Another aspect of the present invention is a process and apparatus for controlling a fluid leak by determining the leak rate of the fluid from the leak source utilizing a sound measuring means wherein the step of determining the fluid leak rate includes the step of comparing the signal from the sound measuring means with a standard curve, and activating a means for controlling the fluid to prevent the fluid from spreading in the atmosphere.

BRIEF DESCRIPTION OF THE DRAWINGS

FIGS. 5, 6 and 7 each illustrate a view (not drawn to any scale) of an arrangement of sensors around the area or object which is under surveillance by the sensors. These figures are for use as visual aids in describing the arrangement and spacing of the sensors with respect to a given source of possible or suspected leak.

DETAILED DESCRIPTION OF THE PREFERRED EMBODIMENTS

The apparatus and process described herein is best used when the fluid leak being monitored and measured is for a known specific fluid and from a known specific fluid source. The source of the fluid is predetermined and can be any process equipment above or below ground containing the fluid for example, tanks, pipes or underground caverns.

The system of the present invention can be used for measuring fluid leak rates. The fluid used in this invention includes any gas or liquid such as defined herein. The fluid can be any material which is inert or hazardous. A "liquid" herein means, for example, liquid propane, propylene, butane and other liquids which flash into a gas. "Non-compressible flashing liquids" are those that flash at atmospheric conditions, i.e. standard temperature and pressure. "Gaseous material" or "gas" as used herein includes vapors. Leak rates of inert gases such as nitrogen can be measured by the system of the present invention. The leak rates of hazardous gases including, for example, toxic and combustible or explosive gases such as ethylene, methane (natural gas), HCN and $H_2S$ can also be measured by the present system.

The present invention will be described herein with reference to combustible gases and, more particularly, with reference to combustible gases stored in underground caverns or wells. However, it is understood that the present invention can be used with any source of fluid as described above.

Combustible gases which are typically stored in underground caverns are normally under high pressures. For example, the gases stored in underground caverns are under pressures ranging from about 600 psig to about 2000 psig and, more preferably, from about 800 psig to about 1500 psig.

Figure 1:
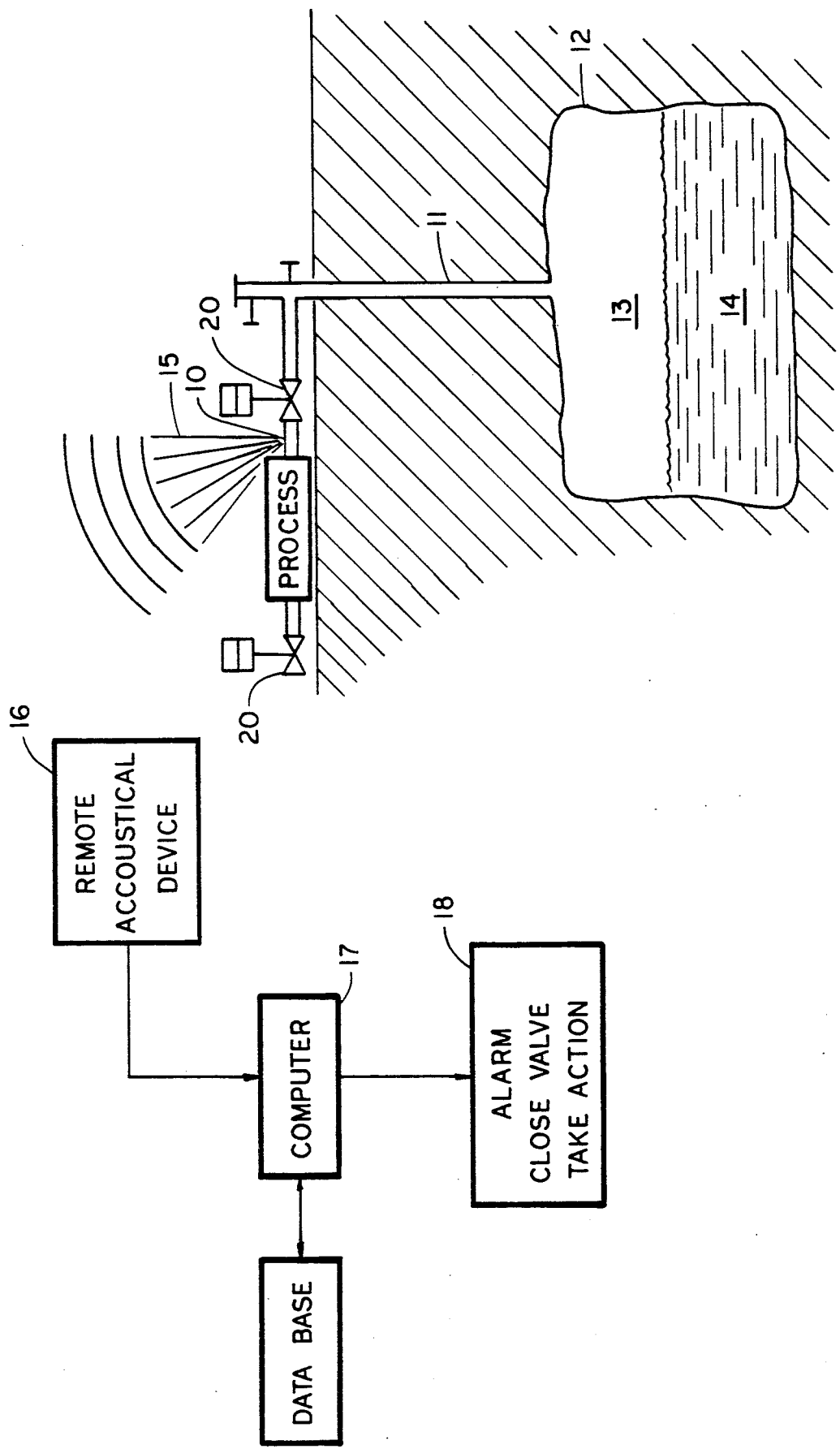
FIG. 1 is a schematic diagram of the present system showing a fluid leak source and a sensor for obtaining data related to a fluid leak.
Figure 2:
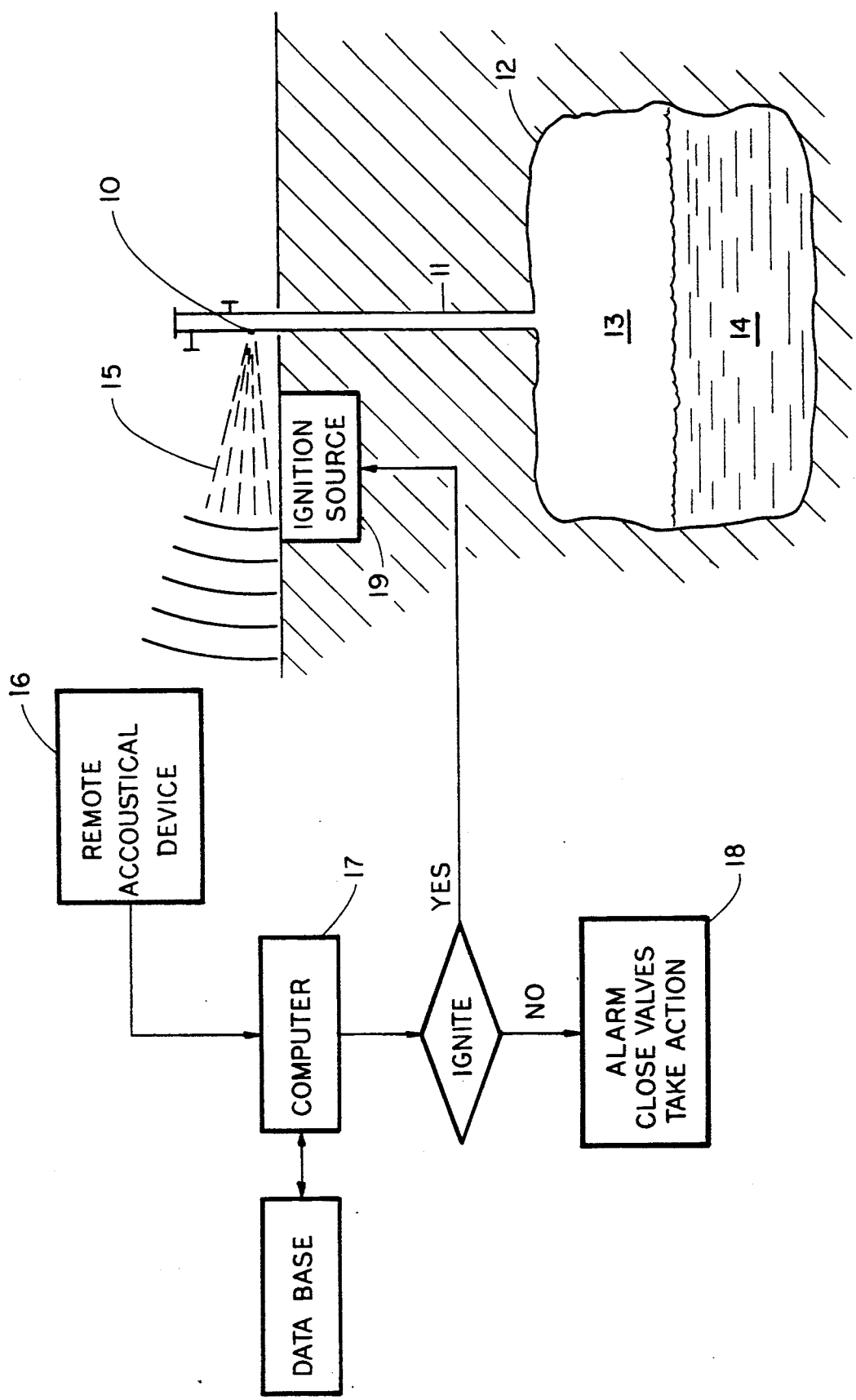
FIG. 2 is a schematic diagram of the present system showing a combustible fluid leak source and a sensor for obtaining data related to a fluid leak.

With reference to FIGS. 1 and 2, there is shown an above-ground gas leak 10 in a piping 11 leading to an underground cavern 12 containing a gas 13 and a liquid media 14, such as brine, stored under high pressure. The sound produced by the gas jet streams 15 leak is picked up by a remote acoustical device (sound detector) 16.

In FIG. 1, there is shown the general process for controlling a gas. Preferably, the signal from the sound detector is communicated to a computer controller and data processor 17 which automatically analyzes the information and activates a control means 18 to take the appropriate action. Based on the sound intensity the computer can determine the amount of leakage and the size of orifice through which the leak is occurring. The action taken in response to the signal of the sound detector can be, for example, to sound an alarm, to allow the gas leak to continue or to shut off the gas leak by closing or opening valves. In this instance, emergency block valves 20 may be closed to isolate the leak from other process equipment and product storage. The computer can be remote from the location of the leak source. The computer or data processor used are those commonly known in the art.

In another embodiment of the present invention a remote control and monitoring device or system may be installed near or at the leak source area to receive a signal from the sound detector and take the necessary action on the site or the remote control and monitoring device can transmit its signal, for example through radio waves or wire hookups, to a central computer or data processor situated in another location.

Figure 3:
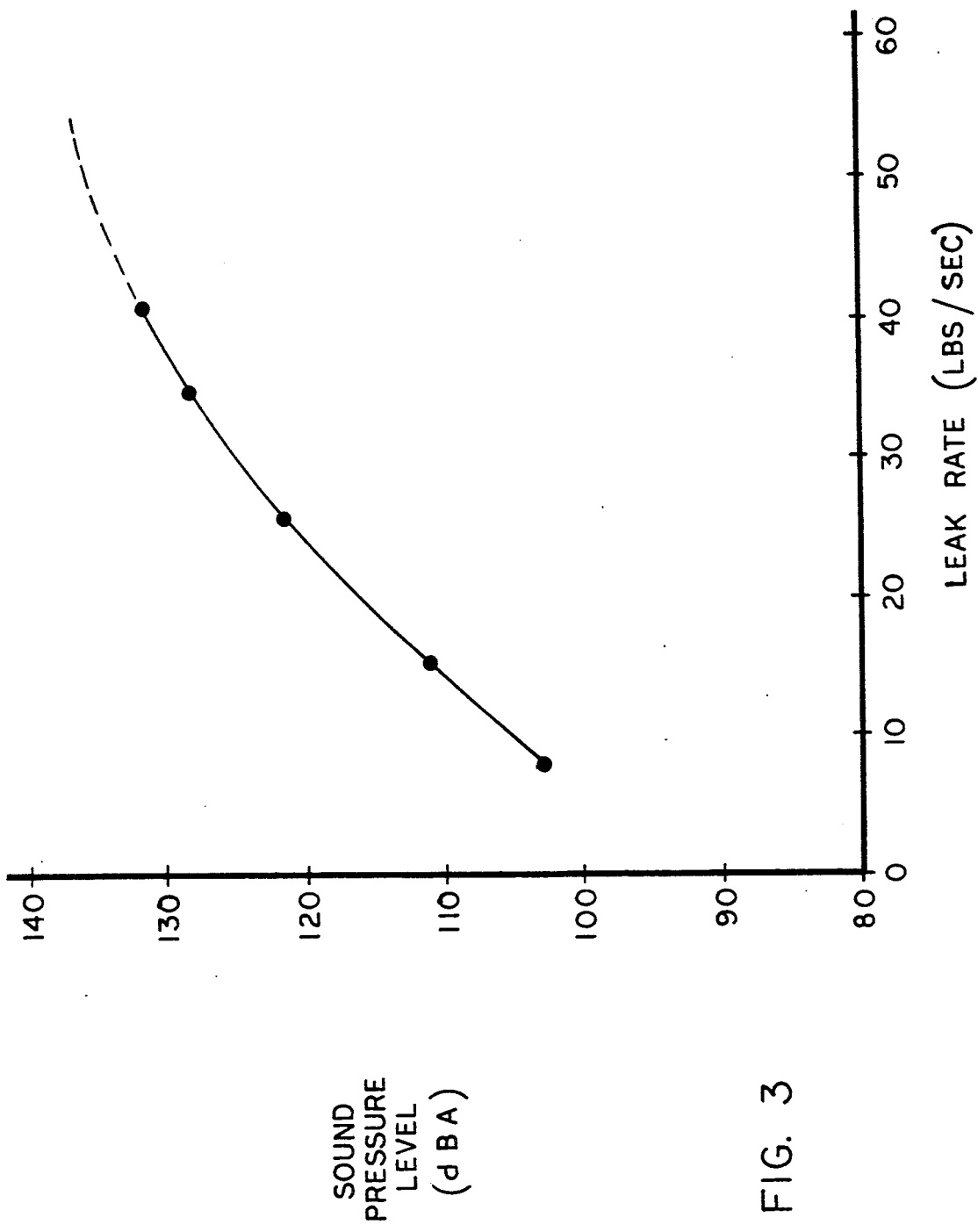
FIG. 3 is a standard curve plotting gas leak rates versus sound pressure levels.

The sound detector used in the present invention can be any conventional sound level meter calibrated for determining the size and rate of the leak. The sound detector used may be, for example, a remote ultrasonic transducer assembly/transmission unit commercially available from UE Systems, Inc., Elmsford, N.Y. The detector senses the intensity of the sound produced by the leak. The output of the sound level meter is the sound intensity or sound pressure level which can be converted to decibel units. The sound intensity data, i.e. sound pressure level or amplitude, is then compared to a standard curve, for example as shown in FIG. 3, relating intensity to leak rate.

A single sound detector at a single predetermined amplitude or predetermined frequency can be used or a plurality of sound detectors at various amplitudes or frequencies can be used. A plurality of sound detectors are preferably disposed in a pattern around the leak source. The sound intensity may vary with the angle between the direction of a leak and the sound detector. It is preferred that the sound level of a leak be measured at least at two angles from the leak source area. The average of the two measurements can then be used for leak rate determination. When two sound detectors are used the sound detectors should be placed at about 180 degrees apart around the leak source area to be monitored. If three sensors are used they should be about 120 degrees apart, or if four sensors are used, they should be about 90 degrees apart. The sound pressure measuring sensor is mounted remotely, separate and apart from the leak source and at a predetermined distance from the leak source. Therefore, the sound detector can advantageously be positioned away from leak sources such as pipes, tanks and wells. The sound detector can be adjusted to respond only on leaks from the leak source without being dependent on the leak source or equipment itself.

FIG. 5 is presented for use as a visual aid in describing an arrangement of 2 sensors (16) wherein the sensors are essentially equidistant (i.e., each radius R is represented by a dotted straight line) from the noise source (15), and each sensor is essentially equiangular from each other (i.e., angle a equals angle b). Each sensor (16) is depicted as being on an imaginary circle (dotted circle 21) having the noise source (15) essentially at, or quite near, the center of the circle (21). The sensors are located on a horizontal plane which may be about the same vertical distance from the ground as the noise source (15) or may be beneficially located on a horizontal plane higher than the noise source (15). Having the sensors (16) on a horizontal plane above the noise source (15) can be beneficial if there are obstructions on the same horizontal plane as the noise source (15), such as tall grass, shrubs, small buildings, or other structures which can interfere with the intensity of the noise level reaching one sensor (16) but not that reaching the other sensor (16). It is not recommended that the distance of the sensors (15) above the plane in which the noise source (16) is located be a distance which is as great or greater than the distance between the sensors (16) themselves.

FIG. 6 is presented as a visual aid (not drawn to scale) in describing substantially the same type of arrangement as that depicted in FIG. 5, except that in FIG. 6 there are 3 sensors which are arranged essentially equidistant from noise source (15) and equiangular from each other, i.e., angle a equals angles b and c.

FIG. 7 is presented as a visual aid (not drawn to scale) in describing substantially the same type of arrangement as that depicted in FIGS. 5 and 6, except that in FIG. 7 there are 4 sensors which are arranged essentially equidistant from noise source (15) and essentially equiangular from each other.

It is not necessary that the sound sensors be exactly equidistant from the leak, considering that they are used to monitor an area, such as shown in FIG. 1 where there are several feet or even several yards of equipment being monitored, a leak may occur anyplace within the monitored area, not merely in the exact center of the monitored area. Furthermore, there may be some reason why a perfectly spaced interval between sensors themselves cannot be achieved in the field because of interfering structures or objects or accessibility. However, the present invention is beneficial, nevertheless, in determining relative rates of leakage based on the noise made by the leak if the sensors are reasonably well located in position around the leak.

The invention is not limited to the use of only 2, 3 or 4 sensors around a given monitored area, and it is within the purview the present invention to use more. However, for most purposes there is not much additional benefit to be gained by using more than 4 sensors, especially considering the increased expense of using more. When uniformly arranged with respect to the center of the area of surveillance, each sensor will be essentially of equal distance from the center, and will also be about equal distance from the sensor on its right and its left.

For gas leaks the frequency of sound measured is in the audible and ultrasound region, preferably in the ultrasound region. For gas leaking from high pressure source, the preferred region is in the ultrasound region, for example, above about 20 KHz. Gas leaks generate sound pressure levels over a broad frequency range. Generally, the process is carried out in the frequency range of from about 1 KHz to about 100 KHz, preferably from about 20 KHz to about 50 KHz and more preferably, from about 35 KHz to about 45 KHz.

For liquid leakage, such as propane, it is preferred to use a lower frequency region. Generally, the frequency is from about 1 KHz to about 40 KHz. Preferably from about 2 KHz to about 10 KHz.

In FIG. 2, there is shown the general process for controlling a combustible gas. The system of FIG. 2 is the same as in FIG. 1 except that an ignition means 19 is added to the process as an option for controlling the gas cloud formed as the gas dissipates into the atmosphere from the gas leak. The action taken in this instance, may be to ignite the gas leak source to avoid the gas from spreading throughout the atmosphere.

The ignition means used in the present invention for igniting combustible gas can be, for example, a pyrotechnic flare pellet expelling device such as an "RTF-45 Return Fire Simulator" commercially available from RTF Industries, Inc., Marshall, Tex. or a "SQUIB" commercially available from Hercules, Inc., Port Ewen, N.Y.

If a gas leak is of negligible size, no action may need to be taken immediately or under an emergency situation. On the other hand, if the gas leak increases to a certain size it may pose a problem to a process or environment and may require immediate action. Such a leak may require that the process area be evacuated, and all emergency block valves closed. In the situation where no automatic emergency block valves are available, i.e. if the leak is upstream from the block valves, there is no possibility of closing off the leak, the gas cloud formed from the leak will spread and adjacent process areas will be endangered.

In the case of a large combustible gas leak, it is extremely important for an operator to know how large the gas leak is immediately. If the large leak continues for several minutes before its size is known, a large combustible gas cloud can form before it reaches an ignition source. The combustible gas cloud spreading along the ground will no doubt reach an ignition source eventually and when the gas cloud is ignited, the resulting explosion will cause extensive damage to the area covered by the gas cloud. Under the above conditions, much less damage would result if the combustible gas cloud could be ignited immediately after it starts. The gas "leak rate" detector provides operating personnel this option.

An important feature of the present apparatus and process is the fact that data of the leak can be obtained remotely, i.e., away from the potentially dangerous area, and that the data can be analyzed quickly for taking action without subjecting personnel to danger of harm.

In addition, the apparatus of the present invention can be installed in the field and left unattended for long periods of time. Preferably, the apparatus is weather resistant and capable of being exposed out in the field.

Another important feature of the present invention is the ability to analyze a potential hazardous situation immediately and take action immediately based on the data obtained from such an analysis.

Yet, another feature of the present invention is the capability of automatically controlling the leak by having a process control computer receive the signal from a "leak rate" detector. The computer can be programmed to take the appropriate action upon receiving input regarding the leak rate.

The standard curve used in the present invention, shown in FIG. 3, is constructed by testing the fluid to be monitored or a fluid that is comparable to the fluid to be monitored using a general testing procedure, described herein. For example, the leak rate of a gas that can be readily tested such as steam or an inert gas such as nitrogen, can be determined at various leak hole sizes. The size of hole data can then be used to calculate the rate at which the leak is occurring. For example, the velocity of the gas may be determined using the following equation:

$$V_a = \frac{Kg_c}{\rho}$$

where
$V_a$ = acoustic velocity in ft./sec.
K = fluid bulk modulus of elasticity lb. force/sq.ft.
$g_c$ = dimensional constant, 32.17 (lb.)(ft.)/(lb.force)(sec$^2$)
$\rho$ = fluid density lb./cu.ft A more thorough discussion of the above calculations can be found in Perry et al., *Chemical Engineers Handbook*, Fifth Edition, McGraw-Hill, Inc., 1973, pp. 5-3 and 5-4.

The velocity data calculated above may be used to obtain leak rates in pounds per second (lb/sec.) using the following equation:

$$(V_a) \times \left(\begin{array}{c}\text{flowing density}\\ \text{of gas}\end{array}\right) \times \left(\begin{array}{c}\text{area of}\\ \text{hole}\end{array}\right) = \text{flow rate in lb/sec}$$

Then based on the "tested" gas rates, a relative leak size and rate can be calculated and set as a standard for any one of several gases which are toxic or combustible that can not be readily tested. The standard curve is then used as a guide for directing an operator to manually take action for managing, controlling or handling the gas leak by comparing the data received from the sound detector to the standard leak rate curve, chart or graph. In another embodiment, the standard curve data can be fed into the data base of a computer and the action required for controlling the gas leak can be carried out automatically.

In addition, the computer may be programmed to monitor the meteorological conditions, for example, wind direction and velocity, temperature of air and ground, air stability, and weather conditions, to aid an operator to decide what action to take under the existing atmospheric conditions in the area of the leak. In another embodiment, the computer can be programmed to automatically carry out an action based on specific atmospheric conditions received in combination with the leak rate data received from the sound detector. Conventional monitoring systems for collecting atmospheric conditions data can be used.

The general testing procedure used to carry out the leak determination and obtain the standard curve preferably uses the sound sensor means for measuring the sound intensity of the gas leak at various controlled angles and distances from the leak source and at different size leak orifices. The sound intensity of the sensor can be converted to decibel units.

One method of carrying out the general testing procedure is as follows:

Step 1) Provide an instrument (sound pressure level meter) for measuring sound pressure levels to respond to a predetermined frequency and which displays the sound pressure levels in parameters such as milliamps or decibels.

Step 2) Calibrate the sound pressure level meter.

Step 3) Set up the sound level meter, remote sensor with appropriate microphone at a distance of about 100 feet from the leak source.

Step 4) Begin with the smallest orifice size to be tested, for example ⅛ inch. The testing apparatus used at the leak source includes, for example, a manual valve, a pressure gauge, a quick opening valve (remotely actuated), a temperature gauge, and the orifice of leak size to be tested.

Step 5) With the sound level meter about 100 feet away and at an angle of 60 degrees from the leak source, open the valves and record the output from the instrument. To get a good reading, the measuring period should be about ten seconds.

Step 6) Note the pressure and temperature of the gas upstream of the orifice.

Step 7) Repeat steps 4 and 5 at 120 degrees from the leak source or any other desired angle.

Step 8) Repeat steps 3, 4, and 5 with another larger size orifice, for example one inch.

The above general procedure above can be followed using, for example, nitrogen as the gas source as outlined below.

EXAMPLE A. Nitrogen leak

Orifice size: 1/2 inch
Angle from sound source: 60 and 120 degrees
Distance from sound source: 100 feet
Gas pressure: 1600–1700 psig
Gas temperature: 86° F.
Gas flow rate: 18.3 lb/sec.
Data:

TABLE A

| Data: The average of the two readings of the leak detector output of Table A in milliamps was 12.8. | | |
|---|---|---|
| Angle from Sound Source (degrees) | Reading (dB) | Detector Output (MA) |
| 60 | 115 | 14.5 |
| 120 | 107 | 11.0 |

EXAMPLE B. Nitrogen leak measurements

Orifice size: 1 inch
Angle from sound source: 60 and 120 degrees
Distance from sound source: 100 feet
Gas pressure: 1500–1600 psig
Gas temperature: 86° F.
Gas flow rate: 34.6 lb/sec.
Data:

TABLE B

| Angle from Sound Source (degrees) | Data: Reading (dB) | Detector Output (MA) |
|---|---|---|
| 60 | 135 | 19 |
| 120 | 110 | 13 |

The average of the two readings of the leak detector output of Table B in milliamps was 16.

EXAMPLE 1

Figure 4:
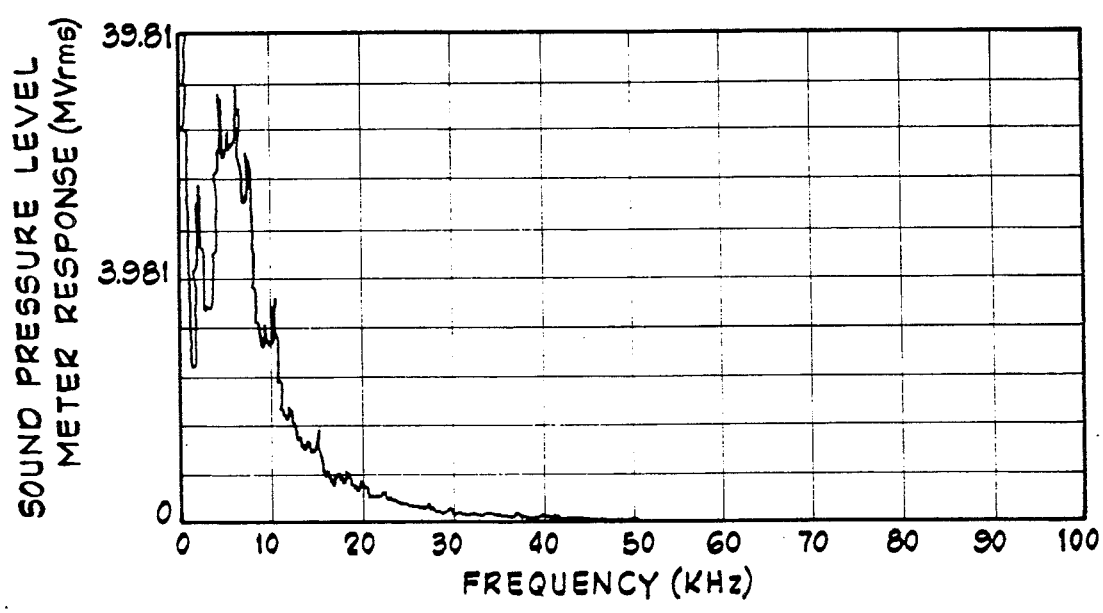
FIG. 4 is a graphic illustration of the maximum sound intensity versus frequency for a liquid leakage.

The sound level of leaking propane was measured using a sound level meter and the signal was fed to a sound spectrum analyzer. A curve similar to that shown in FIG. 4 was obtained. The frequency range of the meter was set at from about 0 to 100 KHz. The following was used to obtain a peak of intensity of the leaking propane at around 6500 Hz:

Orifice size: ⅛ inch
Pressure drop: 900 psig
Distance from source: 60 feet
Angle from sound source: 90 degrees
Propane pressure: 1000 psig
Temperature: ambient At the maximum sound intensity obtained in the above run, the spectrum analyzer output was 39.81 millivolts root mean square (MVrms).

EXAMPLE 2

Comparing sound level of Ethylene and Nitrogen

The maximum sound intensity of leaking ethylene was found to be at about 106 dB and followed closely to that of nitrogen which was measured at 109 dB. The sound levels of both ethylene and nitrogen were measured by allowing the nitrogen and ethylene to leak through a 0.3 inch hole at a pressure of 1200 psig and ambient temperature. The distance from the leak source was 100 ft. and the angle from the sound source was 30 degrees. The flow rate was about 2.5 lb/sec. Ethylene and nitrogen have the same molecular weight and other similar properties and based on similar sound levels measured, ethylene and nitrogen were assumed to generate the same sound and leak producing properties. Therefore, nitrogen was used as standard for determining the leak rates for ethylene.

What is claimed is:

1. A process for determining the leak rate of a fluid through an orifice of a potential leak source area comprising
    (a) providing a predetermined potential leak source area,
    (b) mounting a plurality of sound pressure measuring sensors in a plane wherein said sensors are spaced essentially equidistant from the leak source area and essentially equiangular from each other,
    (c) measuring the sound pressure level, by operation in the sensors, of a fluid leak of the potential leak source area, and
    (d) comparing the sound pressure level measured to a known standard for fluid leak rates.

2. The process of claim 1 wherein the fluid is a liquid.

3. The process of claim 1 wherein the fluid is a gas.

4. A process for determining the leak rate of a fluid through an orifice in a high pressure fluid source comprising:

(a) placing a plurality of sound measuring means remotely separate and apart and at a predetermined distance from a potential leak source area, said sound measuring means being arranged in a plane wherein they are essentially equidistant from the leak source area and they are essentially equiangular from each other, (b) obtaining output signals from the sound measuring means, and (c) comparing the signals to a standard curve for determining the leak rate in said leak source area.

5. A process comprising measuring the leak rate, in a leak source area, of a fluid through an orifice with a plurality of remote acoustical sensors, said sensors being arranged in a plane wherein the sensors are essentially equidistant from the leak source area and essentially equiangular from each other, and activating a control means for controlling the fluid leak based on the leak rate measured, wherein the control means is activated by a computer and data processor.

6. A process for controlling a high pressure fluid leak in a leak source area comprising:

(a) determining the leak rate of the fluid in the leak source area utilizing a plurality of sound measuring means arranged in a plane wherein the sound measuring means are essentially equidistant from the leak source area and are essentially equiangular from each other, wherein the step of determining the leak rate includes the step of comparing the signals from the sound measuring means with a standard curve; and (b) communicating the data from step (a) to an actuating means.

7. The process of claim 6 including activating the actuating means to control the leaking fluid to prevent the fluid from spreading in the atmosphere.

8. The process of claim 7 including activating the actuating means for shutting off the fluid leak to prevent the fluid from spreading in the atmosphere.

9. The process of claim 6 including activating the actuating means for igniting the fluid to prevent the fluid from spreading in the atmosphere.

10. A process for controlling a high pressure combustible fluid leak in a leak source area comprising:

(a) determining the leak rate of the combustible fluid from the leak in the leak source area utilizing a plurality of sound measuring means arranged in a plane such that the said sound measuring means are essentially equidistant from the leak source area and are essentially equiangular from each other, wherein the step of determining the leak rate includes the step of comparing the signals from the sound measuring means with a standard curve, and (b) based on the data from step (a) activating a means for closing emergency block valves such that the leak is isolated from other process equipment and product storage.

11. The process of claim 10 including communicating each data from the sound measuring means to a computer controller and data processor such that the computer responds to the leak to activate a means for closing the valves to isolate the leak.

12. A process for controlling a high pressure combustible fluid leak in a leak source area comprising:

(a) determining the leak rate of the combustible fluid from the leak source area utilizing a plurality of sound measuring means which are arranged in a plane wherein the said sound measuring means are essentially equidistant from the leak source area and are essentially equiangular from each other, wherein the step of determining the leak rate includes the step of comparing the signals from the sound measuring means with a standard curve, and (b) based on the data from step (a) activating a means for igniting the fluid to prevent the fluid from spreading in the atmosphere.

13. The process of claim 12 including communicating each data from the sound measuring means to a computer controller and data processor such that the computer responses to the leak to activate a means for igniting the fluid leak to prevent spreading in the atmosphere.

14. A process comprising the steps of:

(a) measuring the sound pressure of a leak source to determine leak rate in a leak source area;

(b) entering said leak rate data obtained in step (a) into a computer:

(c) monitoring atmospheric conditions;

(d) entering said atmospheric conditions data obtained in step (c) into said computer;

(e) generating a hazard level corresponding to said leak rate with said computer based on the data entered in steps (b) and (d).

15. The process of claim 14 including the step of actuating an alarm based on said hazard level.

16. The process of claim 14 including the step of actuating a means for isolating the leak based on said hazard level.

17. The process of claim 14 including the step of actuating a means for shutting off equipment to prevent further leakage based on said hazard level.

18. The process of claim 14 including the step of actuating a means for igniting the leak based on said hazard level.

19. An apparatus for determining the leak rate of a fluid through an orifice in a leak source area comprising (a) a plurality of means for measuring the sound pressure level of the fluid leak, said plural means for measuring the sound pressure level of the fluid leak being arranged in a plane wherein the said means are essentially equidistant from the said leak source area and are essentially equiangular to each other, and (b) a means for comparing the sound pressure level measured to a known standard for fluid leak rates.

20. An apparatus for controlling a high pressure fluid leak in a leak source area comprising:

(a) a plurality of sound measuring means for determining the leak rate of the leak source, said means being arranged in a plane wherein the means are essentially equidistant from the leak and are essentially equiangular from each other, (b) a means for comparing the signals from the sound measuring means with a standard curve, and (c) an activating means for shutting off the fluid leak to prevent the fluid from spreading in the atmosphere 21. An apparatus for controlling a high pressure fluid leak in a leak source area comprising:

(a) a plurality of sound measuring means for determining the leak rate in the leak source area, said means being arranged in a plane wherein the means are essentially equidistant from the leak and are essentially equiangular from each other, (b) a means for comparing the signals from the sound measuring means with a standard curve, and (c) an activating means for igniting the fluid to prevent the fluid from spreading in the atmosphere.

22. An apparatus for controlling a high pressure combustible fluid leak comprising:

(a) a plurality of sound measuring means for determining the leak rate of the combustible fluid in the leak source area, said means being arranged in a manner wherein they are essentially equidistant from the leak source area and are essentially equiangular from each other, (b) a means for comparing the signals from the sound measuring means with a standard curve, and (c) a means for closing emergency block valves to isolate the fluid leak.

23. An apparatus for controlling a high pressure combustible fluid leak in a leak source area comprising:

(a) a plurality of sound measuring means for determining the leak rate of the combustible fluid in the leak source area, said means being arranged in a plane wherein they are essentially equidistant from the leak source area and are essentially equidistant from each other, (b) a means for comparing the signals from the sound measuring means with a standard curve, and (c) a means for igniting the combustible fluid leak.

24. The apparatus of claim 19 wherein the plural number of the plurality of sound measuring means is 2, 3, or 4.

25. The apparatus of claim 20 wherein the plural number of the plurality of sound measuring means is 2, 3, or 4.

26. The apparatus of claim 21 wherein the plural number of the plurality of sound measuring means is 2, 3, or 4.

27. The apparatus of claim 22 wherein the plural number of the plurality of sound measuring means is 2, 3, or 4.

28. The apparatus of claim 23 wherein the plural number of the plurality of sound measuring means is 2, 3, or 4.

29. The process of claim 1 wherein the plural number of the plurality of sound measuring means is 2, 3, or 4.

* * * * *